May 29, 1956 R. B. KOCH ET AL 2,747,222
PRODUCTION OF NYLON ROD
Filed June 11, 1951 4 Sheets-Sheet 3
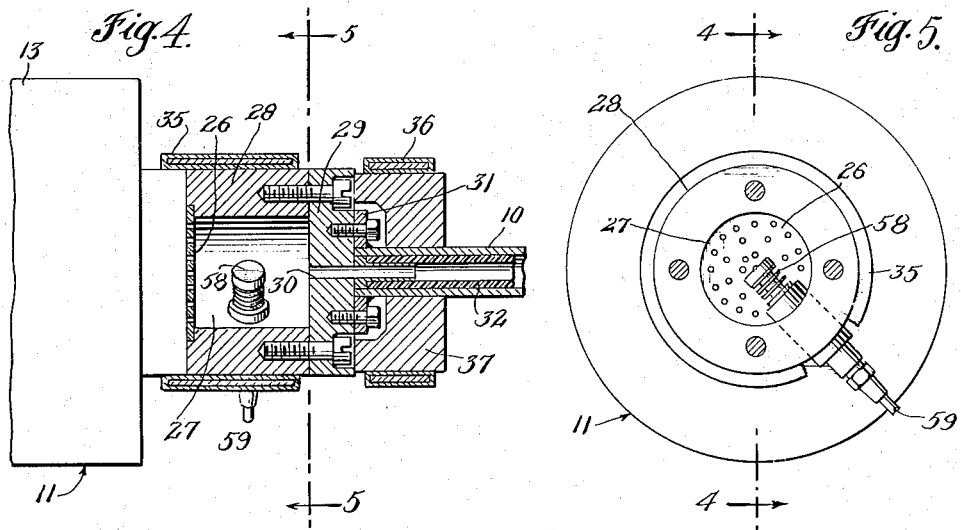
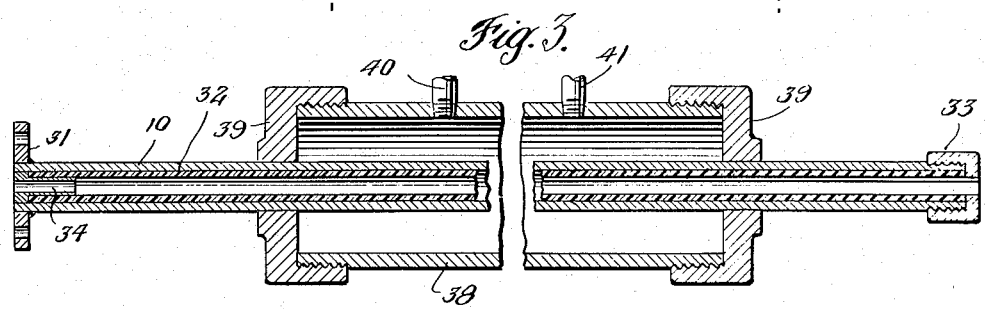
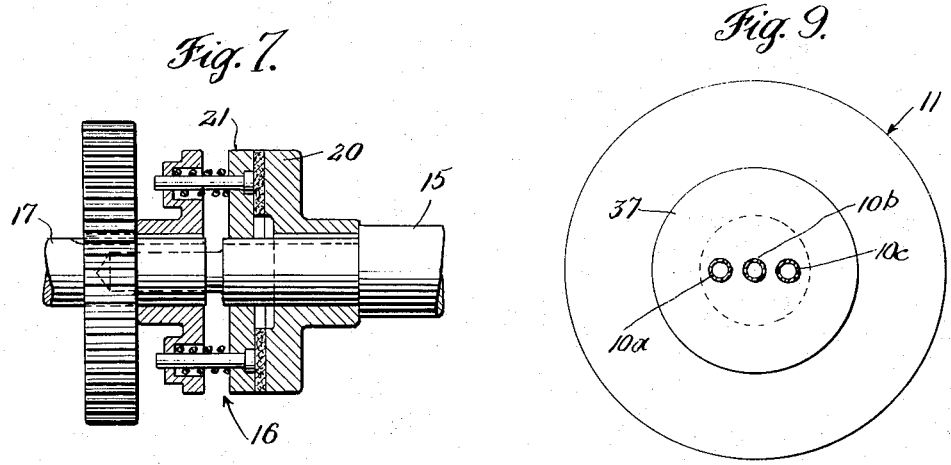
INVENTORS
Robert B. Koch
Ralph E. James Jr
BY William J. Davis
ATTORNEYS

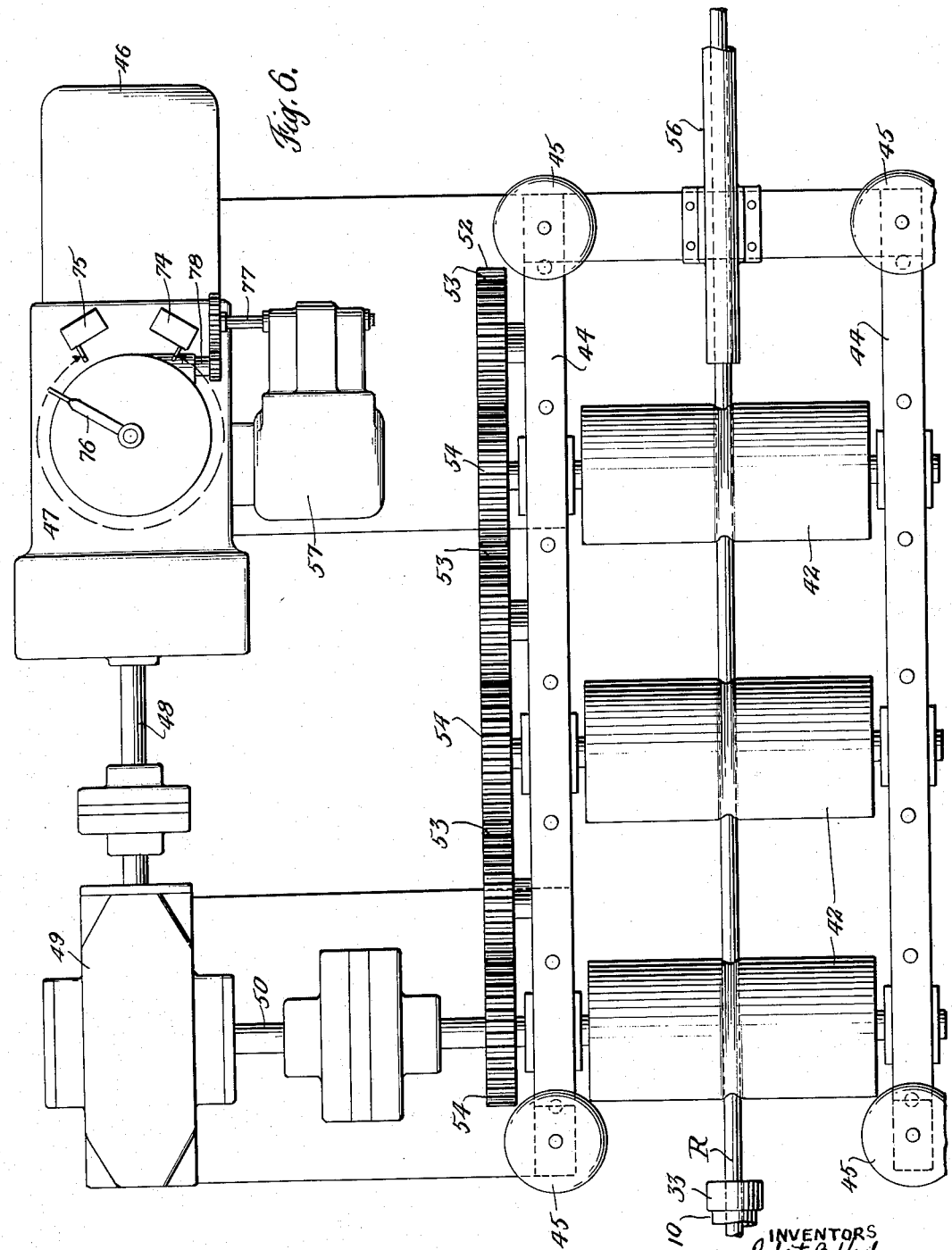

United States Patent Office 2,747,222
Patented May 29, 1956

2,747,222

PRODUCTION OF NYLON ROD

Robert B. Koch, Reading, and Ralph E. James, Jr., Lincoln Park, Pa., assignors to The Polymer Corporation, Reading, Pa., a corporation of Pennsylvania Application June 11, 1951, Serial No. 230,912

5 Claims. (Cl. 18—12)

This invention relates to the production of nylon rod. The invention is especially concerned with method and equipment for continuously forming rod stock from the high melting synthetic linear polyamides, such as polyhexamethylene adipamide and polyhexamethylene sebacamide, which are commonly known in the trade as nylon.

In considering the following description it should be kept in mind that the reference herein to rod stock is intended to refer to elongated pieces of any cross sectional shape whether solid or tubular. Solid cylindrical rod is typical.

In general, the object of the invention is to provide a method and equipment for continuous production of such rod stock having substantially uniform properties throughout the length thereof, the several features of the invention also serving to enable the continuous production of rod stock at an economical production rate.

It is also pointed out that the features of the present invention are in the nature of improvements upon the general type of continuous rod production disclosed in the copending application Serial No. 215,339, of Louis L. Stott, filed March 13, 1951, issued October 4, 1955, as Patent No. 2,719,330, and assigned to the assignee of the present application.

As disclosed in said prior application, the general technique involves the continuous melting and feed of a stream of molten polyamide into the entrance end of a forming tube in which the polyamide is progressively solidified radially inwardly as the material is advanced through the tube.

In order to produce rod stock substantially free of bubbles or porosity, an appreciable pressure must be built up in the molten material in the region behind those portions of the rod which have become solidified in the forming tube. Appreciable variations in this pressure should also be avoided in order to ensure uniformity of characteristics in the formed rod. It has been found that in carrying out an operation of the general kind above referred to, the friction of the external surface of the partially solidified portions of the rod against the inside surface of the forming tube serves as a reaction point against which the feeder of the molten material builds up pressure. At times this frictional resistance to advancement of the formed rod through the tube tends to become excessive, and also, under certain conditions, tends to fluctuate or become insufficient.

With the foregoing in mind, the invention contemplates the employment of means for regulating advancement of the formed rod, for instance a pair of rolls engaging the formed rod beyond the delivery end of the forming tube; and also the provision of variable speed driving mechanism for the feed rolls by which the rate of advancement of the rod through the forming tube may be regulated.

Still another feature of the invention is the provision of a control system for the variable speed drive mechanism which is responsive to fluctuations in the pressure of the molten nylon being fed into the entrance end of the forming tube, this control system being operative to increase the rate of drive of the feed rolls when the pressure of the molten nylon being fed to the entrance end of the tube increases, and to decrease the rate of drive of the feed rolls when the pressure of the molten nylon being fed decreases.

Another feature of the invention is the employment of a special lining for the forming tube, this lining advantageously being made of a solid polymer of tetrafluoroethylene which has an effective working temperature range running well above the melting point of the polyamides. This particular material also has an unusual surface texture providing what might be termed self-lubricating properties; and by the use thereof as a lining in the forming tube the friction of the partially formed rod against the inside wall of the tube is appreciably decreased, which is of especial importance when making rod stock of certain sizes, notably those of small cross sectional area.

According to still another feature of the invention, provision is made for simultaneous production of a plurality of rods or the like, each formed in a separate forming tube, but all fed from a common molten nylon feeding system.

How the foregoing and other objects and advantages are attained will appear more fully from the following description referring to the accompanying drawings, in which—

Figure 3 is an axial sectional view, on an enlarged scale, of a forming tube and cooling jacket arranged according to the invention, the central portion of the tube and jacket being broken out;

Figure 4 is an enlarged axial sectional view through the inlet end of the forming tube and certain parts of the equipment used for the feed of the molten nylon into the inlet end, this view being taken as indicated by the section line 4—4 applied to Figure 5;

Figure 5 is a transverse view taken as indicated by the line 5—5 on Figure 4;

Figure 6 is an enlarged plan view of the feed roll arrangement for engaging the formed rod beyond the delivery end of the forming tube, this view also showing certain of the drive and control mechanism for the feed rolls;

Figure 7 is a sectional view of certain details of a slip clutch advantageously employed in the drive system for the nylon feeder mechanism;

Figure 9 is a view illustrating a modification of the forming tube arrangement in accordance with which a plurality of forming tubes are utilized.

Figure 1:
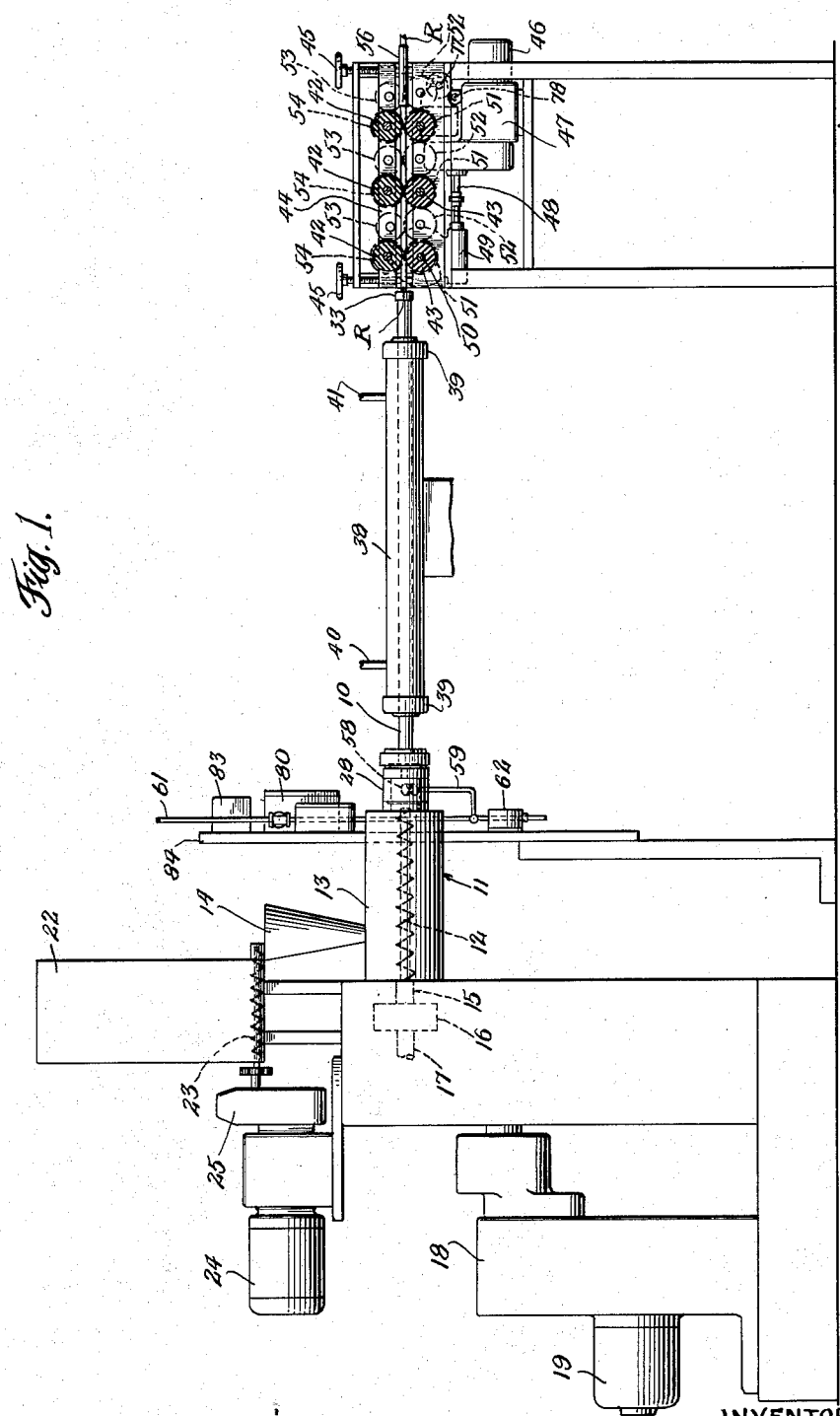
Figure 1 is an outline elevational view of equipment constructed according to the present invention.
Figure 2:
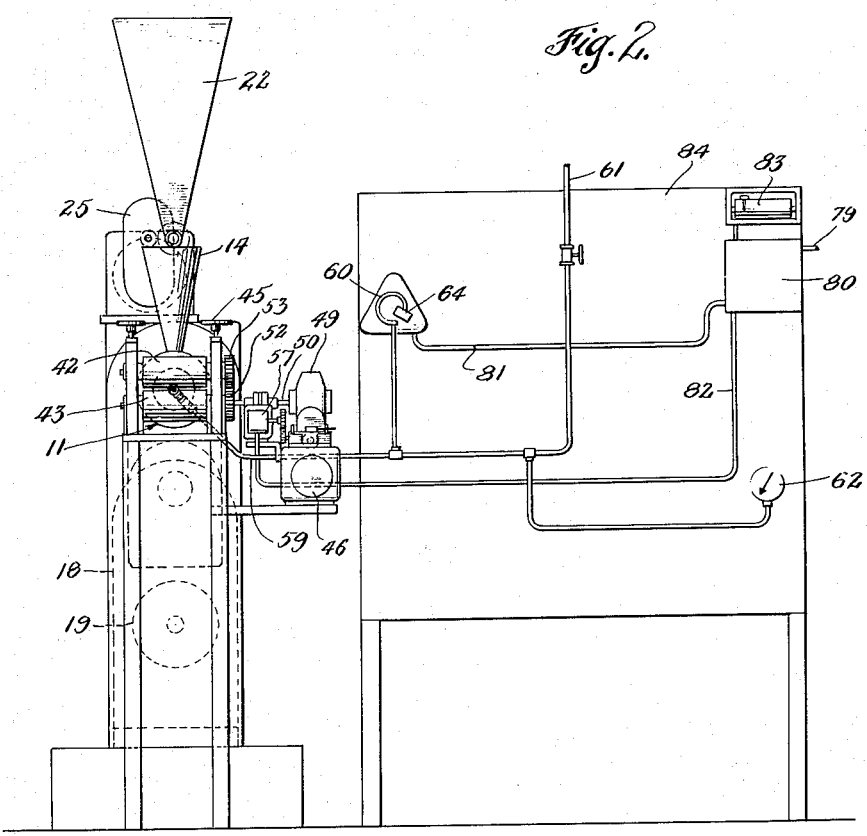
Figure 2 is also an outline elevational view but taken looking from right to left in Figure 1.

In considering the equipment shown in the drawings, reference is first made to the general figures, i. e., Figures 1 and 2. As here shown the forming tube appears at 10, the inlet end (the left end) of this tube being supplied with molten nylon under pressure from the screw feed device generally indicated at 11. This screw feed device, as a matter of structure, is similar to the known screw extruder, and includes a feed screw 12 working in a cylindrical chamber which is sourrounded by heater elements in the form of a heater jacket 13. The nylon, preferably in solid particle form, is fed to the screw feed device as by means of a feed funnel 14 which, in turn, may be fed from a measuring device later described.

The screw 12 of the feed device 11 has a drive shaft 15 adapted to be driven through a slip clutch diagrammatically indicated at 16 which, in turn, is driven from shaft 17. Shaft 17 is geared to the variable speed transmission 18, the latter being driven by a motor 19.

The slip clutch 16 is shown in greater detail in Figure 7 and includes a clutch element 20 connected with shaft 15 and an axially movable clutch element 21 rotative with the shaft 17 and yieldingly urged against clutch element 20. The purpose of this clutch will be described more fully hereinafter.

Returning to the disclosure of Figures 1 and 2, nylon in solid particle form is adapted to be introduced in bulk into the feed hopper 22 in the bottom of which a measuring screw feeder 23 is arranged, the discharge end of this screw delivering to the funnel 14. The screw 23 is adapted to be driven by a motor 24 through a variable speed transmission 25.

The feed screw 23 serves to deliver the nylon to the funnel 14 at a uniform controlled rate and the nylon is thereafter melted in the feed device 11 and is fed by the screw therein under pressure through the perforated breaker plate 26 (see Figures 4 and 5) and to a chamber 27 located within what might be termed the nozzle 28 of the device 11. The end of this nozzle is provided with a closure plate 29 having a central aperture 30 therein for delivery of a molten stream of nylon from the chamber 27 into the entrance end of the forming tube 10.

As clearly seen in Figures 3 and 4 the entrance end of the tube 10 is provided with an external flange 31 adapted to be bolted to the closure plate 29 in position to bring the entrance end of the tube into registry with the port 30 in said closure plate. The tube 10 is lined, substantially throughout its length, with a liner 32 which, as above indicated, is preferably formed of polytetrafluoroethylene. This tube liner is retained within the tube 10 by a threaded and apertured cap 33 at the discharge end of the tube; and at the inlet end of the tube a sleeve 34 projects into the liner, this sleeve being provided with a shoulder fitting the inside wall of the tube 10 itself and also the end wall of the liner. The bore in the sleeve 34 is in registry with the port 30 and the device 34 aids in positioning the liner and in preventing molten nylon from entering between liner 32 and tube 10.

In addition to the heater jacket which surrounds the screw feed device 11, various portions of the nozzle and the inlet end of the forming tube itself are advantageously kept at relatively high temperature. This may be accomplished by the use of additional heater elements such as shown at 35 and 36. The first of these surrounds the chamber 27 and the second surrounds a metal block 37 which in turn engages the inlet end portion of the forming tube itself.

Throughout the major portion of the length of the forming tube a cooling jacket is provided. In the arrangement shown in the drawings this includes a cylindrical jacket member 38 with end caps 39—39, the jacket space being provided with an inlet 40 and an outlet 41 for a cooling liquid, such as water.

As best seen in Figures 1 and 6, the formed rod R is delivered from the discharge end of the forming tube and passes between lead rolls, advantageously between a plurality of pairs of such rolls indicated at 42—43. These rolls are desirably formed of relatively soft rubber and, if desired, may be provided with grooves to increase the area of frictional engagement of the rolls with the formed rod. The upper rolls of the pairs are mounted in framing structure such as indicated at 44, which is vertically adjustable as by the hand wheels 45, so that the pressure of engagement of the rolls with the formed rod may be regulated.

The rolls 42 and 43 are adapted to be driven by a motor indicated in outline at 46 which operates through a variable speed transmission 47, the latter being coupled by shafting 48 with speed reducing gearing 49. Power is delivered from the reducing unit through shaft 50 to the mounting shaft for one of the lower rolls 43. The lower rolls of the other pairs are interconnected with the lower roll of the first pair by gearing 51—52. The upper roll of each pair is driven from one of the intermediate gears 52 by means of gears 53 and 54. By this gearing arrangement the rolls of all pairs are so operated as to provide the same rod feeding action from all pairs. Limited adjustability of the rolls, as by the hand wheels 45, may be effected notwithstanding the relative movement effected thereby as between the upper and lower gears 53 and 52.

A guide tube 56 is mounted beyond the last pair of rolls and serves to prevent bending of the formed rod as it is delivered from the rolls.

As already mentioned hereinabove a control system is utilized for the variable speed drive for the pairs of rolls 42—43. This control system includes a servo mechanism for changing the ratio of drive in the variable speed transmission 47. In the form illustrated this is accomplished by means of a reversible motor 57 (see particularly Figure 6) which shifts the drive ratio up or down according to the direction of rotation of motor 57. Variable speed transmissions of this kind being known and forming no part of the present invention per se, the details of the structure thereof are not illustrated or described herein. Control for the motor 57 is derived from the pressure of the molten nylon being fed into the entrance end of the forming tube. The control system for this purpose is described just below.

As best seen in Figures 4 and 5, a pressure responsive device, advantageously in the form of a bellows 58 is disposed within the chamber 27 of the delivery nozzle of the feed device 11. This bellows 58 is connected by the fluid pressure line 59 (see also Figure 2) with a Bourdon tube 60. Operating fluid, for instance oil, may be supplied to this fluid pressure system through the valved supply line 61. A pressure gauge 62 may also be connected with the system to give a direct reading of the pressure of the molten nylon being delivered to the forming tube.

Figure 8:
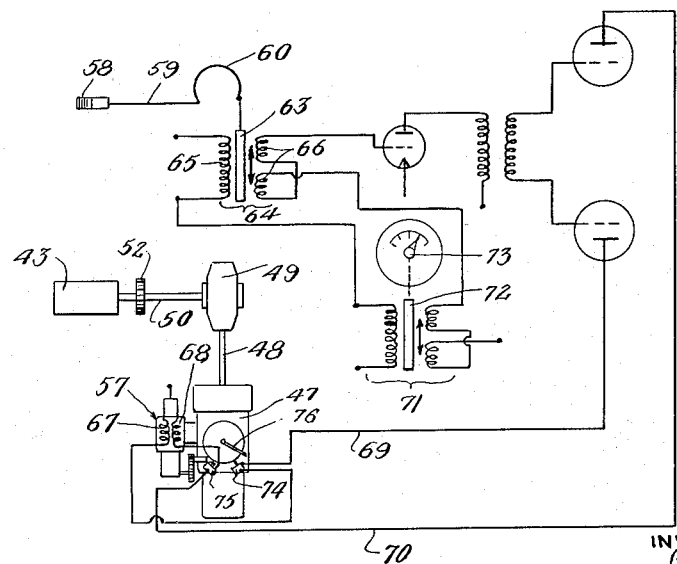
Figure 8 is a schematic view of certain portions of the control system for the feed rolls shown in Figure 6.

Certain of the roll driving parts and of the fluid pressure system described just above are also illustrated diagrammatically in the schematic layout of Figure 8. As there seen, the free end of the Bourdon tube 60 is connected to the armature 63 of a transducer 64 having a primary winding 65 and secondary winding 66. The primary winding is supplied with current from an external source and movement of the armature 63 in opposite directions, according to the fluctuations in pressure in the nozzle chamber 27 results in delivery of a control signal from the secondary winding 66 to an electronic amplifier and control unit, a few elements of which are diagrammatically shown in Figure 8. The details of this type of amplifier and control system being well known need not be illustrated or described herein. It is here mentioned, however, that the control motor 57 for the variable speed transmission 47 is of the universal type capable of being reversed. The winding 67 provides for rotation in one direction and the winding 68 for rotation in the other direction. The windings are adapted to be respectively energized through leads 69 and 70 originating in the amplifier and control unit, and one or the other of these leads is supplied with energizing current according to the direction of movement of the armature 63 and thus according to the rise or fall in pressure of the molten nylon being fed. The electronic amplifier and control unit may also include a transducer device 71 having a manually adjustable core 72 which is shiftable by means of the control knob 73. This device serves to establish the reference pressure which the system as a whole will tend to maintain.

Each of the leads 69 and 70 is provided with a make-break switch, these being shown at 74 and 75 (see Figures 6 and 8), which constitute safety or limit switches operating in the manner described just below.

As seen in Figure 6, the motor 57 not only serves to adjust the variable speed transmission 47 but also serves to operate the switch actuating arm 76. The shaft 77 which is driven by motor 57 is geared with a shaft 78 and this in turn is connected with the control parts of the variable speed transmission 47 and in addition with the arm 76. The normal range of movement of the arm 76 is indicated by the arrow in Figure 6, and as there shown, when the arm approaches one limit of this movement it will operate switch 75 to break the circuit 70. Similarly, when the arm 76 reaches the other limit of its normal range it will operate switch 74 to break circuit 69. These switches 74 and 75 and the range of travel of the arm 76 are arranged so that the operating circuits for the motor 57 are broken just short of the limits of adjustment of the variable transmission 47 in either sense.

Referring again to Figure 2, some of the electrical connections and units of the control system are diagrammatically indicated in outline. Thus, a conduit for a power supply line appears at 79 leading to the electronic amplifier and control unit 80. A conduit 81 for electrical connections extends between unit 80 and the transducer 64 of the Bourdon unit, and a similar conduit 82 extends to the motor 57. If desired a recorder 83 may be associated with the unit 80, so as to record the actual operating conditions. All of these parts are supported on the panel board 84.

Before considering certain phases of the operation reference is made to the modification of Figure 9 which illustrates in transverse section an arrangement of a plurality of forming tubes fed from a single screw feed device 11. As here shown three tubes 10a, 10b and 10c are provided and these three tubes are arranged in a common plane, preferably in the plane of the pass between the feed rolls 42—43 which are disposed beyond the delivery ends of the three tubes, so that all three rods being formed may be engaged by the same feed rolls. With regard to an arrangement such as shown in Figure 9 it may be mentioned that the use of a plurality of forming tubes fed from a common feeding device provides for increased production of rod stock, especially in smaller sizes, with given equipment.

In considering the operation of the equipment described, it is assumed, for purposes of illustration, that a rod of about ½" diameter is being formed from polyhexamethylene adipamide. For this purpose the inside diameter of the lining in the forming tube would normally be slightly greater than ½" diameter since the polyamide shrinks on solidification.

Prior to delivery of the bulk polyamide in solid particle form to the feed hopper 22, the nylon is preferably subjected to a drying operation, advantageously under heat and vacuum, this treatment being carried on sufficiently to reduce the moisture content of the material to a value below about .3% by weight. This is of importance in minimizing tendency for the development of bubbles or porosity in the formed rod and also to avoid degradation or depolymerization, because of removal of moisture itself, and because of removal of other volatile materials present.

The nylon used may contain other materials, such as fillers, pigments, etc.

The dried particle material is fed in measured quantities or at a measured rate by the screw 23 into the feed funnel 14 and thus to the screw 12 of the feeder unit 11. The heater jacket 13 of this unit provides for melting of the polyamide as the material is advanced by the screw and the molten material is delivered from the end of the screw into the nozzle chamber 27, and therefrom to the entrance end of the forming tube itself. The action of the feeder screw 12 and the melting of the nylon therein serves to liberate additional volatile materials, which return in counterflow and are discharged in gaseous form through the feed funnel 14. This action of the screw device is also of advantage since it serves to deliver molten nylon in a condition substantially free of such volatile constituents as tend to develop porosity or bubbles in the rod being formed.

As the molten nylon advances in the forming tube it progressively solidifies radially inwardly from the zone of contact with the interior of the forming tube, so that an interior region of generally conical shape is established in which the nylon remains molten and therefore subject to the pressure developed by the feed screw 12, in the general manner described in the copending application above identified. As the outer or surface layers of the materials solidify radially inwardly the solidified material shrinks and progressively draws away from the interior wall of the forming tube. During the course of solidification and consequent shrinkage additional molten material is fed through the interior conical region to compensate for interior shrinkage and thereby prevent development of voids within the rod being formed. The formed rod, which, depending upon the diameter of the rod and also upon operating conditions, may be solidified throughout the entire cross section or throughout a substantial portion of the cross section, is ultimately delivered from the forming tube and engaged by the feed rolls 42—43.

In the typical operation here under consideration (employing polyhexamethylene adipamide) the temperature of the molten nylon is preferably appreciably above the freezing point, for instance from about 490° F. to about 560° F.

A suitable pressure in the formation of rod of about ½" diameter from polyhexamethylene adipamide is from about 100 lbs. to 1000 lbs./sq. in., especially satisfactory results having been obtained in the range from about 300 lbs. to 400 lbs./sq. in.

For the purpose of accelerating the cooling and solidification of the material as it passes through the forming tube, the jacket temperature is desirably from about −76° F. to about +180° F. The cooling temperature used will of course depend upon a number of factors including, not only the cross section of the rod being formed, but also the rate of operation, the length of the cooling zone, etc.

In the formation of rod of about ½" diameter the feed rolls 42—43 are normally operating to exert a pull on the rod, and thereby assist in advancement of the formed rod through the forming tube. With the control system described above, and assuming a setting of the system to establish an average pressure of about 400 lbs. in the molten nylon being fed to the tube, if the pressure rises above that value, the bellows 58 is compressed, thereby actuating the Bourdon tube 60 to adjust the control system in a manner to increase the speed of transmission through the variable speed transmission 47 and thereby increase the action of the feed rolls 42—43 to draw the formed rod through the forming tube. Conversely, if the pressure drops below the established datum pressure (400 lbs. in this example) the action of the control system decreases the rate of drive of the feed rolls 42—43 and thus reduces the pull on the formed rod. If a sudden or large drop in pressure of the molten nylon occurs, the action of the control system in regulating the drive of rolls 42—43 may even impose a braking force or resistance to advancement of the rod out of the tube.

With regard to the foregoing action of the feed rolls 42—43 it should be kept in mind that the operation will vary widely according to the cross section of the rod being formed. In general, with rods of very small cross section increase in pull is desired, whereas with rods of large cross section the feed rolls 42—43 normally act as a braking means, resisting advancement of the rod through the tube. With rod of any given diameter, however, the operating conditions may fluctuate from time to time in such a manner as to change the action of the feed rolls from that of actually assisting the advancement of the rod to that of a brake, or vice versa.

It is to be noted that the action of the rolls 42—43 serves an important function in regulating the pressure of the molten nylon being fed to the entrance end of the forming tube. This regulation is of importance for a number of reasons including the fact that it avoids extensive increase in pressure from the reference value established by the control system. The build up of an excessively high pressure is disadvantageous as it tends to cause jamming of the rod being formed and also tends to cause damage to the polytetrafluoroethylene liner for the tube. Still further, the build up of excessive pressure tends to develop high strain in the piece being made.

On the other hand if the pressure drops too far, the rod formed is apt to become coarse in structure, or to develop porosity or voids.

Extensive fluctuations in pressure from the reference pressure established by the control system are also disadvantageous since they result in nonuniformity of characteristics of the rod produced and also result in changes in diameter or cross sectional area of the rod produced. Thus, while rod may be made at pressures within the ranges indicated hereinabove, it is preferred to operate continuously within a more limited range and to control the pressure so that it will remain within said more limited range in any given production run. For example, for one given production run, assume the selection of 400 pounds pressure as the reference pressure. In this case it is contemplated to operate the control system to avoid departure from the reference pressure to an extent more than about 200 lbs. plus or minus. For still greater uniformity in cross sectional area and in physical properties, the control system should be operated to avoid departure from the reference pressure to any appreciable extent or at least to retain the pressure within limits of about 100 pounds plus or minus.

Similarly, in the case of another production run, where the reference pressure selected is, for example, 750 pounds, the control system should be adjusted to avoid increase in pressure above about 950 pounds and below about 550 pounds.

In the event of abnormal or excessive build-up of pressure in the molten nylon being fed to the forming tube, the slip clutch 16 will serve to limit further build-up of pressure.

It will be understood that when employing polyhexamethylene sebacamide, certain of the operating conditions, especially temperatures, will differ from those referred to above. Thus, whereas the adipamide has a melting point at about 507° F. the sebacamide has a melting point at about 455° F., and when using the latter material the screw feed device 11 would of course be operated to establish a somewhat lower temperature, for instance from about 455° F. to about 525° F.

When employing a plurality of forming tubes all of the formed rods are engaged by the same feed rolls (42—43) and this is of advantage in ensuring uniform rate of feed of the several rods with respect to each other. In turn this aids in obtaining uniform properties in all of the rods, as it ensures uniform pressure and feed of the molten material into the entrance ends of the several forming tubes.

We claim:

1. In equipment of the kind described for making elongated shapes from synthetic linear polyamides, a cooled forming tube in which the polyamide is solidified and from which the polyamide is delivered in the form of the desired elongated shape, a heated screw feed device for advancing a column of molten polyamide under pressure into the entrance end of said tube, and a control system for regulating the pressure in the entrance end of the tube to maintain said pressure between predetermined upper and lower limits, said control system including a pressure responsive control element exposed to the pressure of the molten polyamide at the entrance end of the tube, mechanism for regulating the rate of advancement of the solidified polyamide, and a control connection between said pressure responsive element and said advancement regulating mechanism providing for regulation of the rate of advancement of the polyamide to stabilize the pressure in the entrance end of the forming tube and to maintain said pressure between said upper and lower limits.

2. Equipment according to claim 1 including a plurality of forming tubes and in which the molten polyamide is advanced under pressure into the entrance ends of said tubes and further in which said advancement regulating mechanism includes common means for regulating the advancement of the polyamide in all of said tubes.

3. Equipment according to claim 2 in which said tubes lie in a common plane and in which said common means is constructed and arranged to apply a uniform force retarding advancement of each of the elongated shapes beyond the exit ends of the forming tubes.

4. Equipment according to claim 3 in which the common means comprises a feed roller engaging all of the elongated shapes.

5. The method for forming elongated shapes from synthetic linear polyamides comprising delivering a stream of molten polyamide into the entrance end of a forming tube, advancing the polyamide through the tube by exerting a force thereon, progressively solidifying the polyamide in the tube by heat transfer through the tube wall during such advancement, in which method the pressure in the molten polyamide in the entrance end of the tube and the resistance to advancement of the polyamide through the tube tend to vary together spasmodically and irregularly, and controlling the pressure in the entrance end of the tube to maintain said pressure within predetermined upper and lower limits by varying the magnitude of said force in accordance with variations in pressure.

References Cited in the file of this patent

UNITED STATES PATENTS

| Number | Name | Date |
|---|---|---|
| 1,879,367 | Lotz | Sept. 27, 1932 |
| 2,156,895 | Godat | May 2, 1939 |
| 2,295,942 | Fields | Sept. 15, 1942 |
| 2,369,359 | MacWilliam et al. | Feb. 13, 1945 |
| 2,402,462 | Sullivan | June 18, 1946 |
| 2,403,476 | Berry et al. | July 9, 1946 |
| 2,435,426 | Davies | Feb. 3, 1948 |
| 2,436,201 | Cole | Feb. 17, 1948 |
| 2,484,506 | Hawk | Oct. 11, 1949 |
| 2,512,844 | Weber | June 27, 1950 |
| 2,540,146 | Stober | Feb. 6, 1951 |
| 2,566,854 | Rhodes | Sept. 4, 1951 |
| 2,568,332 | Genovese | Sept. 18, 1951 |
| 2,581,614 | Veit | Jan. 8, 1952 |

FOREIGN PATENTS

| Number | Country | Date |
|---|---|---|
| 263,730 | Switzerland | Jan. 3, 1950 |